United States Patent [19]
Hwang

[11] Patent Number: 5,610,577
[45] Date of Patent: Mar. 11, 1997

[54] AUTOMOBILE FRONT-WHEEL ORIENTATION AND TURNING-ANGLE INDICATOR

[76] Inventor: Jin-Lai Hwang, No. 200, Sec. 1, Ming-Sheng North Road, Kuei-San, Taoyuan Hsien, Taiwan

[21] Appl. No.: 524,375

[22] Filed: Sep. 6, 1995

[51] Int. Cl.⁶ ........................................ G01S 3/56
[52] U.S. Cl. ................. 340/465; 340/425.5; 340/438; 340/672; 116/31
[58] Field of Search ................. 116/31; 340/425.5, 340/438, 465, 672

[56] References Cited

U.S. PATENT DOCUMENTS

| | | | |
|---|---|---|---|
| 2,282,189 | 5/1942 | Jackson | 116/31 |
| 2,845,893 | 8/1958 | Eshbaugh et al. | 116/31 |
| 3,673,561 | 6/1972 | Bronstein | 340/438 |
| 4,485,371 | 11/1984 | Yamada et al. | 340/438 |

Primary Examiner—Jeffrey Hofsass
Assistant Examiner—Mark S. Rushing
Attorney, Agent, or Firm—Bucknam and Archer

[57] ABSTRACT

An automobile front-wheel orientation and turning-angle indicator is arranged at the center of the steering wheel to indicate the orientation and turning-angle of the front-wheel. The indicator comprises a rotating disk, a scale disk, an indicator disk, and a housing. Wherein the scale disk has a dead weight to maintain at all times a constant orientation. A rotating disk is located at the lower part of the whole indicator and is mounted on the steering wheel. The indicator is driven by the rotating disk through transmission means, so as to produce a rotation relative to the scale disk, and to achieve the purpose of indicating orientation and turning-angle of the front-wheel.

1 Claim, 5 Drawing Sheets

5,610,577

AUTOMOBILE FRONT-WHEEL ORIENTATION AND TURNING-ANGLE INDICATOR

FIELD OF THE INVENTION

The present invention relates to an automobile front-wheel orientation and turning-angle indicator, particularly to an indicator mounted on the center of the steering wheel to indicate the orientation and turning angle of the front-wheel.

BACKGROUND OF THE INVENTION

In an automobile reduction gearing is normally provided in the steering mechanism. Nowadays a power steering device is mostly equipped in an automobile to reduce force of wheel steering operation. In particular, the effectiveness of a power steering is more notable when an automobile is in a static status and tries to turn the steering wheel. Saving effort in steering by means of power steering makes the driver more comfortable, however, the turning angle is often made unconsciously too large or too small.

Such a situation may usually occur especially when making side parking or backing into the garage. Under Such circumstances, many trials have to be done sometimes for a young hand driver without experience. An experienced old hand driver may be able to park in position easily, but after positioning, he still has no idea about the turning angle of the front-wheels. Therefore, after parking or before driving out it is necessary to observe the position of the front wheels.

To overcome the above-mentioned defects, a great deal of creations and improvements have been made heretofore, such as Taiwanese Patent Application No. 77207046 entitled "Indicating Means for Turning Angle of Front-wheels of Automobile" and Application No. 83200296 for "Indicating Instrument for Turning Angle of Automobile Steering Wheel", etc. are the typical examples. However, these prior designs are not so ideal because, on the one hand, the constructions are too complicated to put in operation, and on the other hand, the costs are too high to be used. In consequence, they have not been generally used.

SUMMARY OF THE INVENTION

The present invention is to provide an automobile front-wheel orientation and turning-angle indicator, which is simple in construction, accurate in operation, and easy in mounting, so as to overcome the defects of the conventional art.

BRIEF DESCRIPTION OF THE DRAWINGS

The objects, the technical measure, and the function of the present invention will be understood more clearly when considered in connection with the following drawings, in which.

DETAILED DESCRIPTION OF THE DRAWINGS

Figure 1:
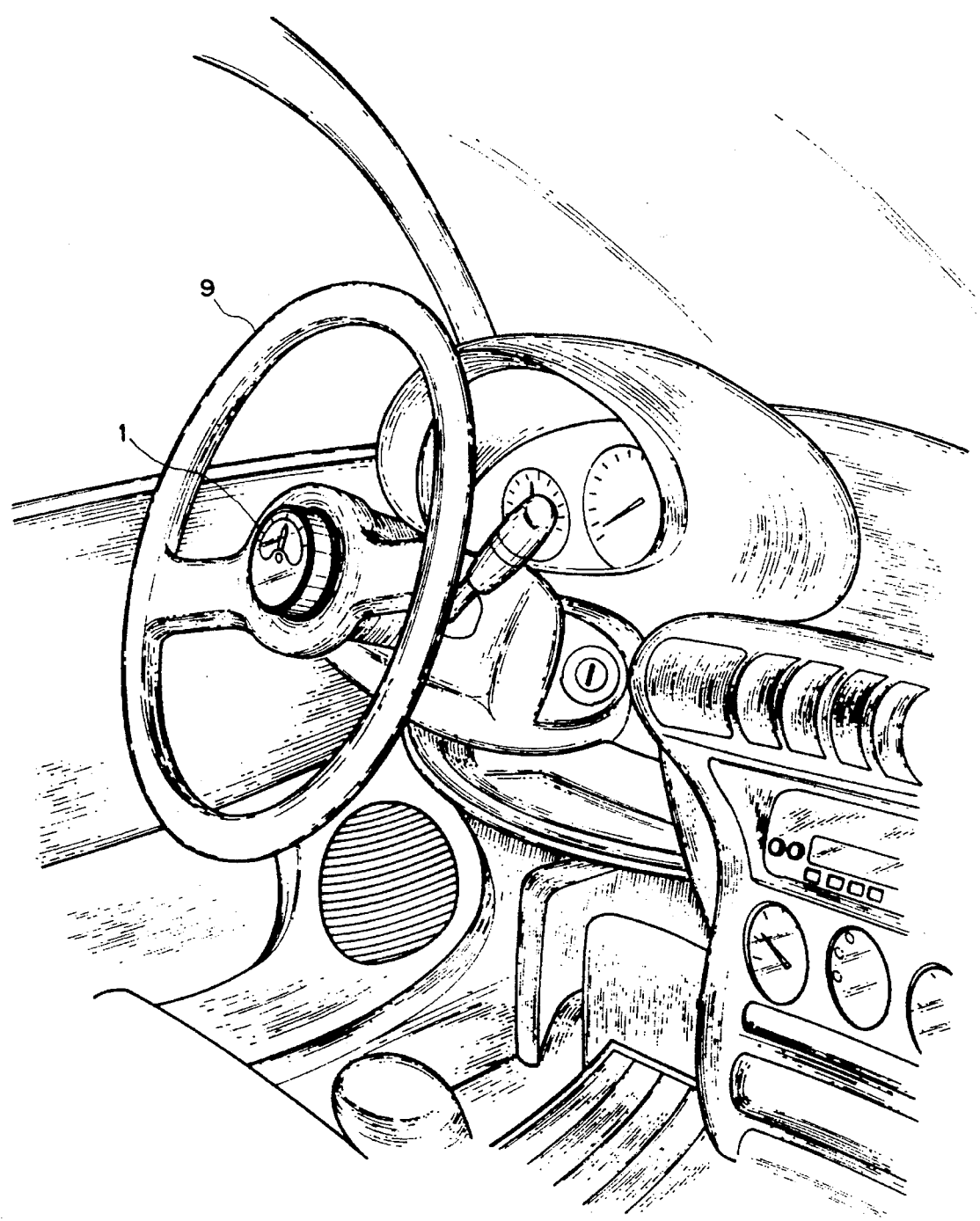
FIG. 1 is a schematic view showing the mounting of the embodiment of the present invention.

Referring to FIG. 1, the automobile front-wheel orientation and turning-angle indicator 1 according to the embodiment of the present invention is mounted on the center of the steering wheel 9 for indicating the orientation and turning angle of the front-wheels.

Figure 2:
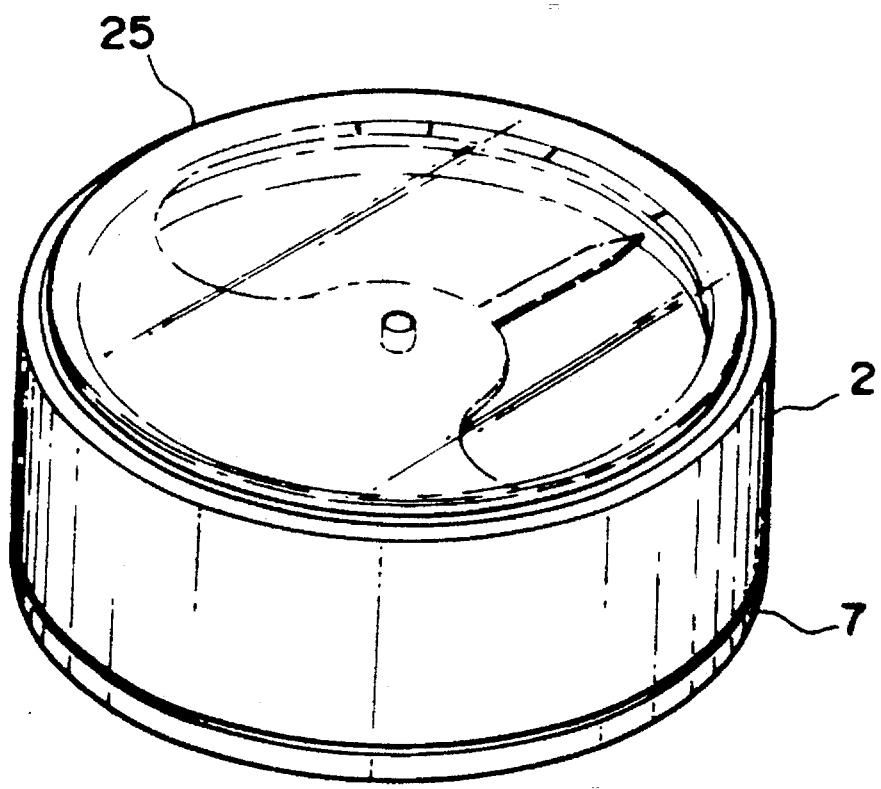
FIG. 2 is a perspective view of the embodiment of the present invention.
Figure 3:
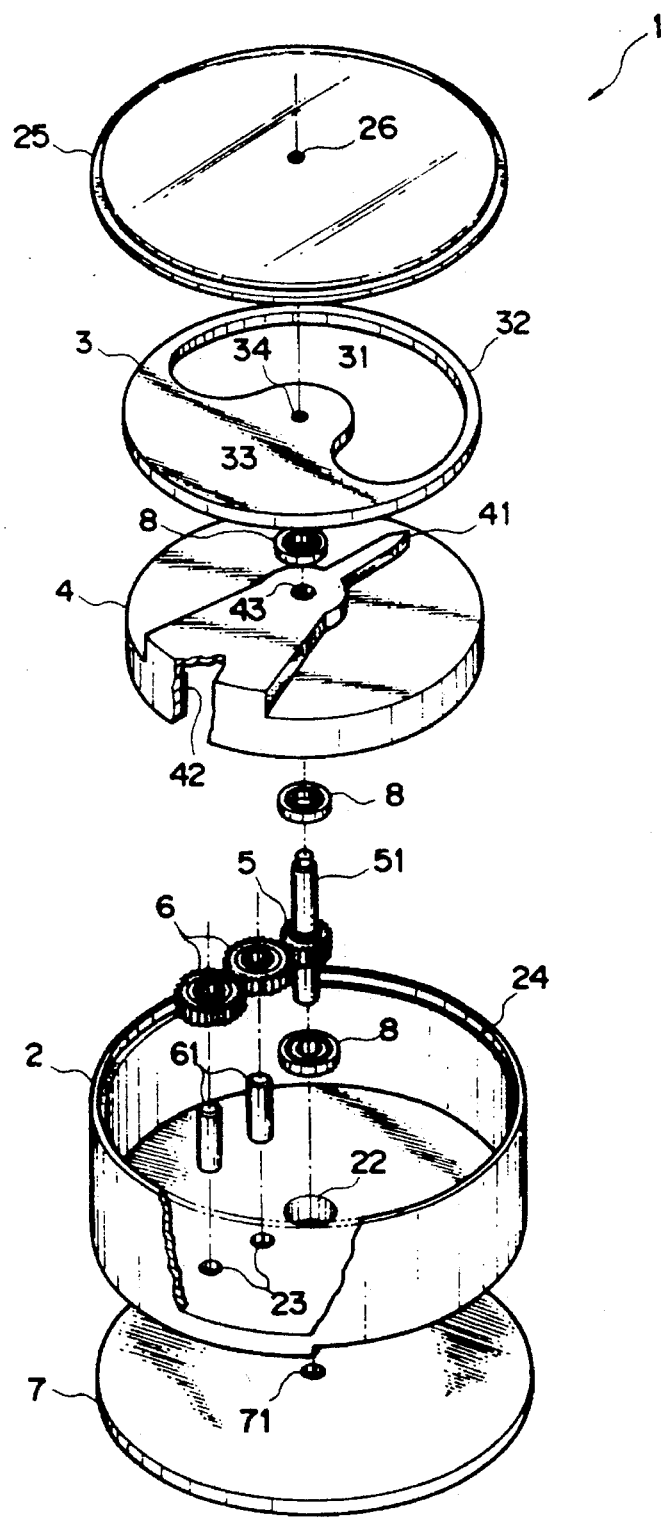
FIG. 3 is a perspective view with parts being exploded of the embodiment of the present invention.

As shown in FIGS. 2 and 3, the embodiment of the present invention mainly comprises housing 2, a scale disk 3, an indicator disk 4, a driving gear 5, two idle gears 6, and a rotating disk 7, wherein the housing 2 is formed as a circular container having a bearing hole 22 at the center of the bottom, and two holes 23 beside the bearing hole 22, where the three are aligned with one another. A recessed flange 24 is provided at the periphery of the opening of the housing 2, and a transparent plate 25 having a hole 26 at the center, fits into the opening of housing 2 to abut against recessed flange 24.

The scale disk 3 is disposed uppermost inside the housing 2, wherein upper half part of the scale disk 3 is shaped as a visual window 31, while the lower half part of the scale disk 3 is formed as a dead weight 33. Appropriate scales 32 are formed around the upper edge of the visual window 31 which has a hole 34 at the center. The indicator disk 4 is disposed inside the housing 2 and is beneath the scale disk 3. The indicator disk 4 is formed as a circular lid with an upward-protruded pointer 41 formed thereon and an internal gear 42 at the periphery of the inside of the indicator disk 4.

The driving gear 5 along with a spindle 51 is disposed between the indicator disk 4 and the bottom of the housing 2; the upper portion of the spindle 51 passing through the hole 43 of the indicator disk 4, the hole 34 of the scale disk 3, and the hole 26 of the transparent plate 25 individually with a bearing 8; and the lower portion of it passing through the bearing hole 22 of the housing 2 with the bearing 8, and extending downward for a suitable length. The two idle gears 6 are mounted on the axles 61 respectively which extend through the holes 23 of the housing 2, the idle gears 6 mesh with the driving gear 5 and the internal gear 42 of the indicator disk 4, so that the rotation of the spindle 51 can transmit to the indicator disk 4 sequentially. The rotating disk 7 is disposed under the housing 2 and is provided at the center with a hole 71 for receiving the lower edge of the spindle 51 which is connected with the center of the steering wheel 9 for rotation. In combination, so long as to assemble downward in sequence, as shown in FIG. 3, the gears, the indicator disk, the scale disk, and the transparent plate, so that the present invention can be accomplished, as shown in FIG. 2.

Figure 4:
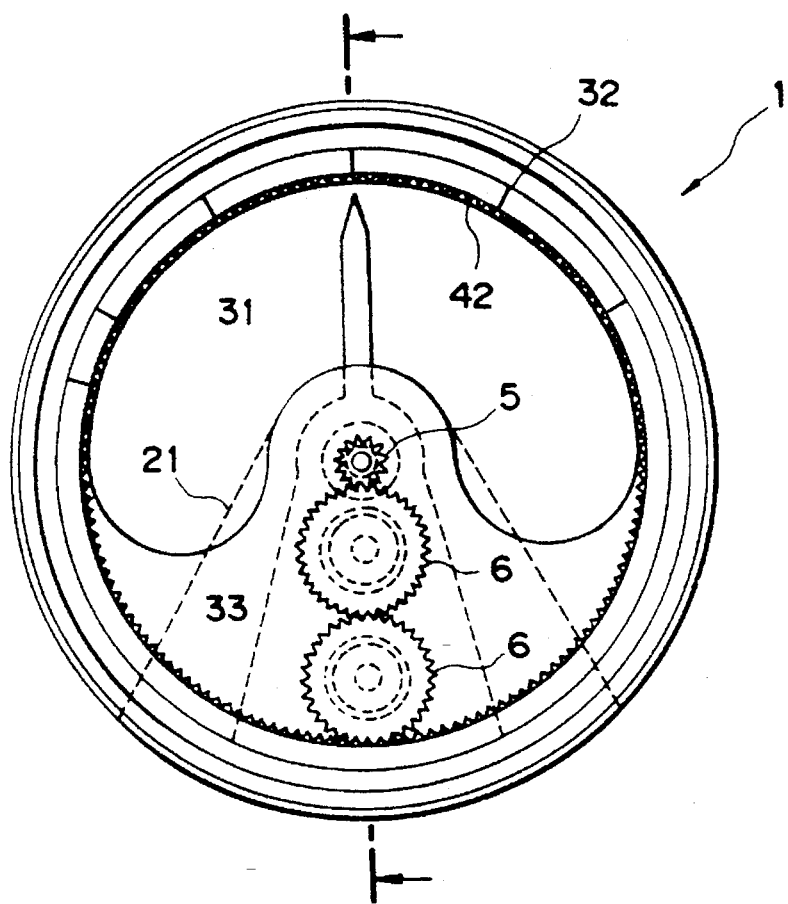
FIG. 4 is a top view of the embodiment of the present invention.
Figure 5:
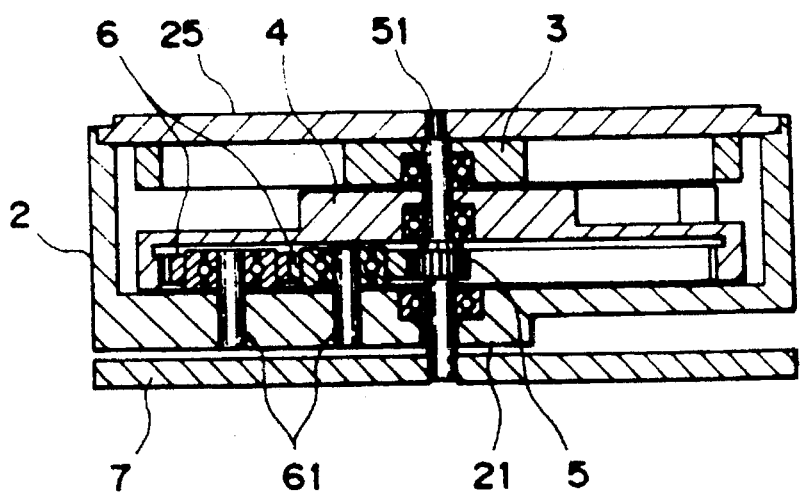
FIG. 5 is a lateral cross-sectional view of the embodiment of the present invention.
Figure 6:
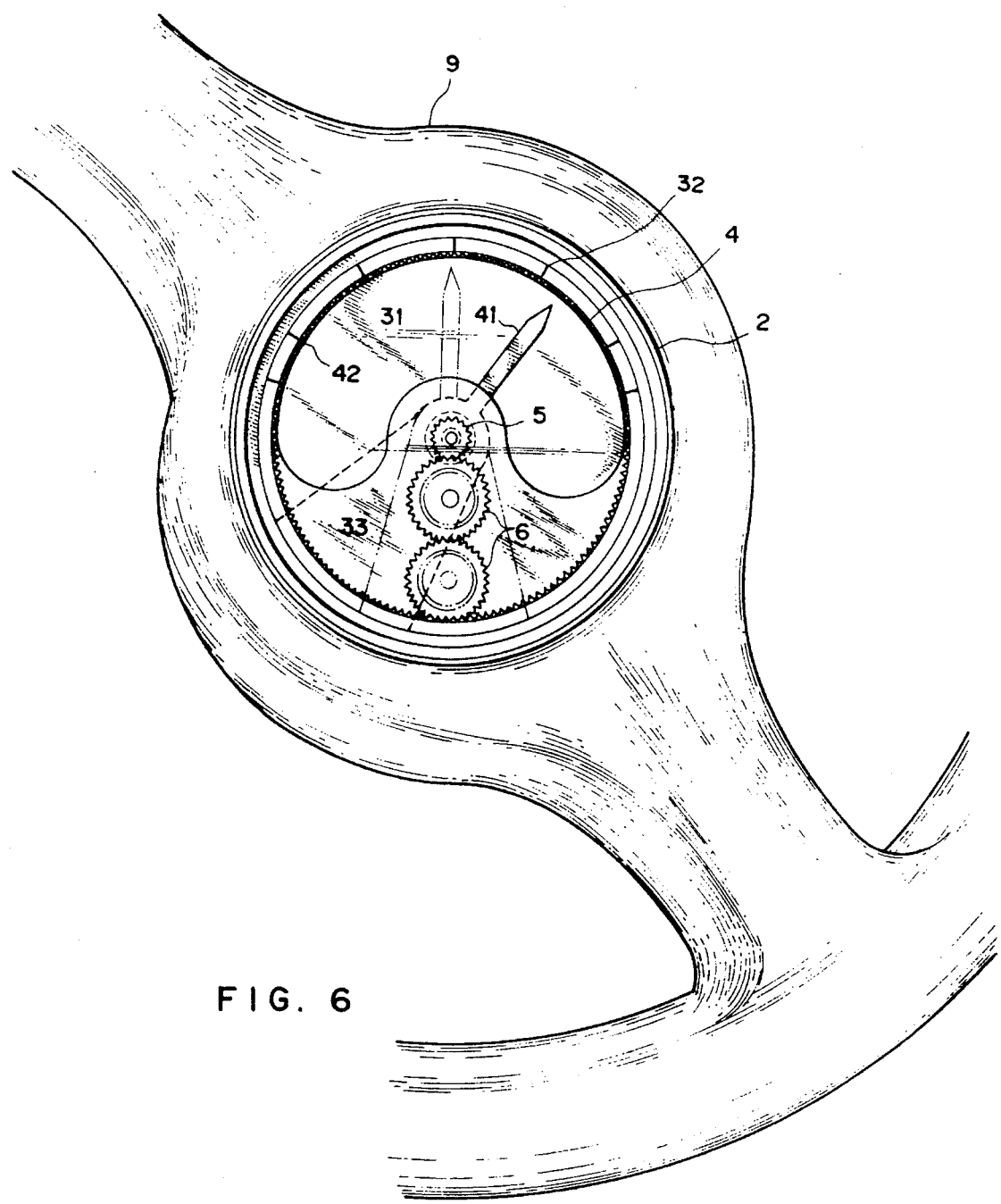
FIG. 6 shows the state of use of the embodiment of the present invention.

Now referring to FIGS. 4 and 5, the two idle gears 6 of the embodiment of the present invention are positioned between the driving gear 5 and the internal gear 42 of the indicator disk 4 where the idle gears 6 are aligned with the driving gear 5 diametrically and are engaged with one another, so that the rotation of the steering wheel 9 located thereunder can be transmitted to the indicator disk 4 through the rotating disk 7, the spindle 51, the driving gear 5, and the two idle gears 6, and that the indicator disk 4 can be rotated accordingly. The housing 2 is provided at the bottom on which the gears are mounted, with a dead weight 21, the action of which is the same as the dead weight 33 of the scale disk 3, which maintains the housing 2 at a certain orientation after the indicator disk 4 has been tilted with the turning of the steering wheel 9, so as to provide a guideline to view the range of rotation of the indicator disk 4. As shown in FIG. 6, in the embodiment of the present invention, rotation of the driving gear 5 is transmitted to the indicator disk 4 through the two idle gears 6, so that the indicator disk 4 will be rotated in the same direction as the steering wheel 9 drives the driving gear 5. Since the dead weights 21 and 33 are individually provided on the housing 2 and the scale disk 3, and the steering wheel 9 is in tilted positioned, the dead weights 21 and 33 will always maintain at the lower position after installation, making the visual window 31 held still at the upper position as a basis of indication of the indicator disk 4, and making the idle gears 6 maintained at a certain position, so that the turning angle of the front-wheels can be accurately indicated.

To sum up all the foregoing, the present invention is specifically designed provide in the housing the scale disk which always keeps a fixed orientation, and the indicator disk which is driven through the steering wheel the rotating disk, the spindle, the driving gear, and the two idle gears. The invention is very simple in construction and is rather accurate in indication. In addition, installation is very easy so long as to connect the lower rotating disk to the center of the steering wheel. The invention effectively overcomes the defects of the conventional art and certainly satisfies the requirement of the drivers. The invention, therefore, is useful, novel and industrially applicable.

While the particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the invention.

What is claimed is:

1. An automobile front-wheel orientation and turning-angle indicator, comprising:

a housing, being formed as a circular container, and having a dead weight of thicker portion formed at the bottom of the housing, wherein the housing is provided at its center a bearing hole, and two holes are formed at the dead weight beside the bearing hole so that the three holes are aligned diametrically with one another, and a transparent plate being provided at the opening of the housing, where a hole is located at the center of the transparent plate;

a scale disk, being positioned nearby the upper portion of the inside of the housing, wherein upper half part of scale disk is formed with a visual window while the other lower half part of the scale disk is formed as a dead weight, the upper edge of the visual window is calibrated with appropriate scales and the center of the scale disk with a hole;

an indicator disk, being mounted inside the housing and beneath the scale disk, formed as a disk of circular-lid configuration on which an upward protruded pointer is formed with, and an internal gear being formed around the periphery of the inside of the indicator disk;

a driving gear, being mounted on a spindle and positioned between the indicator disk and the bottom of the housing , the upper portion of the spindle being mounted with a bearing and passing through the hole of the indicator disk, of the scale disk and of the transparent plate, whereas the lower portion of the spindle being mounted with a bearing and passing through the bearing hole of the housing and extended downward for a suitable length;

two idle gears, being individually mounted with axles are positioned in the holes of housing, where the idle gears are positioned between the driving gear and the internal gear of the indicator disk, so that the mounted idle gears are aligned with the driving gear and thereby the rotation of the spindle is sequentially transmitted to the indicator disk; and a rotating disk, being mounted underneath the housing, where the center of the rotating disk is provided with a hole so as to receive the lower end of the spindle which is connected to the center of the steering wheel for rotation purpose.

\* \* \* \* \*